United States Patent
Shang-Chun

[19]

[11] Patent Number: 5,928,503
[45] Date of Patent: Jul. 27, 1999

[54] DRINKING WATER PURIFICATION MACHINE HAVING UPSTREAM RESERVOIR, REVERSE OSMOSIS FILTER AND PURIFIED WATER STORAGE TANK

[76] Inventor: Lin Shang-Chun, 1st Floor, No. 1, Alley 35, Lane 11, Sec. 5, Fu-An Rd., An-Nan Dist. Tainan, Taiwan

[21] Appl. No.: 08/959,016

[22] Filed: Oct. 28, 1997

[30] Foreign Application Priority Data

Mar. 13, 1997 [TW] Taiwan ................................. 86203825

[51] Int. Cl.$^6$ ............................. B01D 17/12; B01D 61/12
[52] U.S. Cl. ........................... 210/86; 210/104; 210/121; 210/195.2; 210/257.2; 210/258
[58] Field of Search ............................. 210/86, 104, 109, 210/110, 121, 137, 195.2, 257.1, 257.2, 258, 259, 962, 652, 175, 182; 222/146.1, 189.06

[56] References Cited

U.S. PATENT DOCUMENTS

| | | | |
|---|---|---|---|
| 3,856,676 | 12/1974 | Grimm et al. | 210/96.2 |
| 4,626,346 | 12/1986 | Hall | 210/257.2 |
| 5,017,284 | 5/1991 | Miler et al. | 210/257.2 |
| 5,282,972 | 2/1994 | Hanna et al. | 210/195.2 |
| 5,435,909 | 7/1995 | Burrows | 210/121 |
| 5,520,816 | 5/1996 | Kuepper | 210/195.2 |
| 5,639,374 | 6/1997 | Monroe et al. | 210/257.2 |
| 5,658,457 | 8/1997 | Schoenmeyr | 210/257.2 |
| 5,766,453 | 6/1998 | Morellato et al. | 210/257.2 |
| 5,788,835 | 8/1998 | Telander et al. | 210/195.2 |
| 5,817,231 | 10/1998 | Souza | 210/257.2 |

*Primary Examiner*—Joseph W. Drodge
*Attorney, Agent, or Firm*—Rosenberg, Klein & Bilker

[57] ABSTRACT

The present invention relates to a desktop drinking water machine and includes a reverse osmosis mechanism consisting of a reverse osmosis filter and a pair of active carbon filters. The reverse osmosis mechanism is linked to a pump through an inlet pipe, a pure water pipe connected to a reservoir and an outlet pipe connected to the original reservoir where both pipes link the original reservoir to the pump. A water level sensor in the reservoir is linked with the pump through a processor to control a water pumping operation. When the water level rises above the water level sensor, the pump is initiated and delivers water from the reservoir into the reverse osmosis mechanism. Pure water then flows into the storage tank and waste water flows to the reservoir. When the volume of the water in the reservoir is approximately one-third of the volume of the original water maintained in the reservoir, the pump is deactivated. At this time, the purified water contained in the storage tank approximates two-thirds of the volume of the water in the reservoir which provides for an increased purifying rate.

4 Claims, 2 Drawing Sheets

DRINKING WATER PURIFICATION MACHINE HAVING UPSTREAM RESERVOIR, REVERSE OSMOSIS FILTER AND PURIFIED WATER STORAGE TANK

BACKGROUND OF THE INVENTION

1. Field of the Invention

The present invention relates to a desktop drinking water machine, and more particularly to a machine which combines a reverse osmosis apparatus and an original reservoir coupled together to supply water for purifying and clarification of water in order to use less water in the purification stage.

2. Description of Prior Art

People are now concerned about the purity of drinking water for health purposes, since our water resources are being polluted gradually. In accordance with the conventional drinking water machine with a purifying system, the purification devices utilized in such systems are generally classified into two types, reverse osmosis filtration and active carbon filtration. For the convenience of drinking both clarified cool water and clarified hot water, a drinking water machine supplying both cool and hot clarified water has come out on the market, in which the purifying apparatus mentioned above is built in. For a reverse osmosis drinking water machine utilizing inlet and outlet pipes, the machine is usually located next to the water tap and drainage outlet, where the original water is led into the reverse osmosis apparatus directly from the tap. The reverse osmosis drinking water machine divides the water into pure water and waste water, the waste water draining out of the system. The pure water is guided into a storage container, whereas the waste water is drained out directly. But in this method, the volume of pure water gathered after the purify processing is generally only two-fifths of the volume of the original water with three-fifths of the original water left as waste. Such a large proportion of waste water is unacceptable.

For the convenience of producing both cool and hot water any time or place, a portable desktop drinking water machine may be used when necessary, but most of the drinking water machines presently available can only warm and freeze the drinking water without the function of purifying the water. Thus, the water must be purified using a purifying machine, such as the one mentioned above. Two drinking water machines, one with a purifying device and a second with a heating and cooling system, such as mentioned above, must both be used, which increases cost of production, and makes the process of supplying drinkable water quite difficult. Such a way of producing drinking water is uneconomical.

Combining a traditional reverse osmosis drinking water machine, which produces a high proportion of waste water, with an additional desktop heating and cooling machine both doubles cost and adds inconvenience. This invention overcomes these burdens.

OBJECTS AND SUMMARY OF THE INVENTION

It is therefore one object of this invention to provide an independent desktop drinking water machine, in which a reverse osmosis apparatus is installed, which draws its water supply from an original water reservoir. The waste water flows back into the original reservoir and is recirculated through the purification system, so the machine is capable of supplying a sufficient quantity of pure drinking water.

The present invention provides a reverse osmosis apparatus consisting of a reverse osmosis filter and two active carbon filters. The reverse osmosis apparatus is coupled to a pump via an inlet pipe, a pure water pipe, connected to a storage tank, and an outlet pipe which leads back to the original reservoir. A water level sensor linked to the pump, through a processor, controls the pumping operation and is mounted in the original reservoir. When the water level is above the water level sensor, the pump is triggered to deliver water from the original reservoir to the reverse osmosis apparatus under commands flowing from the processor. Water is then purified by the reverse osmosis apparatus, the pure water flowing into the storage tank, and the waste water will flow back into the original reservoir through the outlet pipe, to be recirculated through the system. The water left in the original reservoir is about one-third of the total volume of the reservoir. When the water level drops below the water level sensor, the pump will be cut off by the processor. At this time, the pure water obtained is about two-thirds of the volume of the original water, indicating a rise in the purification rate, and the water in the reservoir is about one-third of the volume of original water, and can be used for other purposes.

DETAILED DESCRIPTION OF PREFERRED EMBODIMENTS

Figure 1:
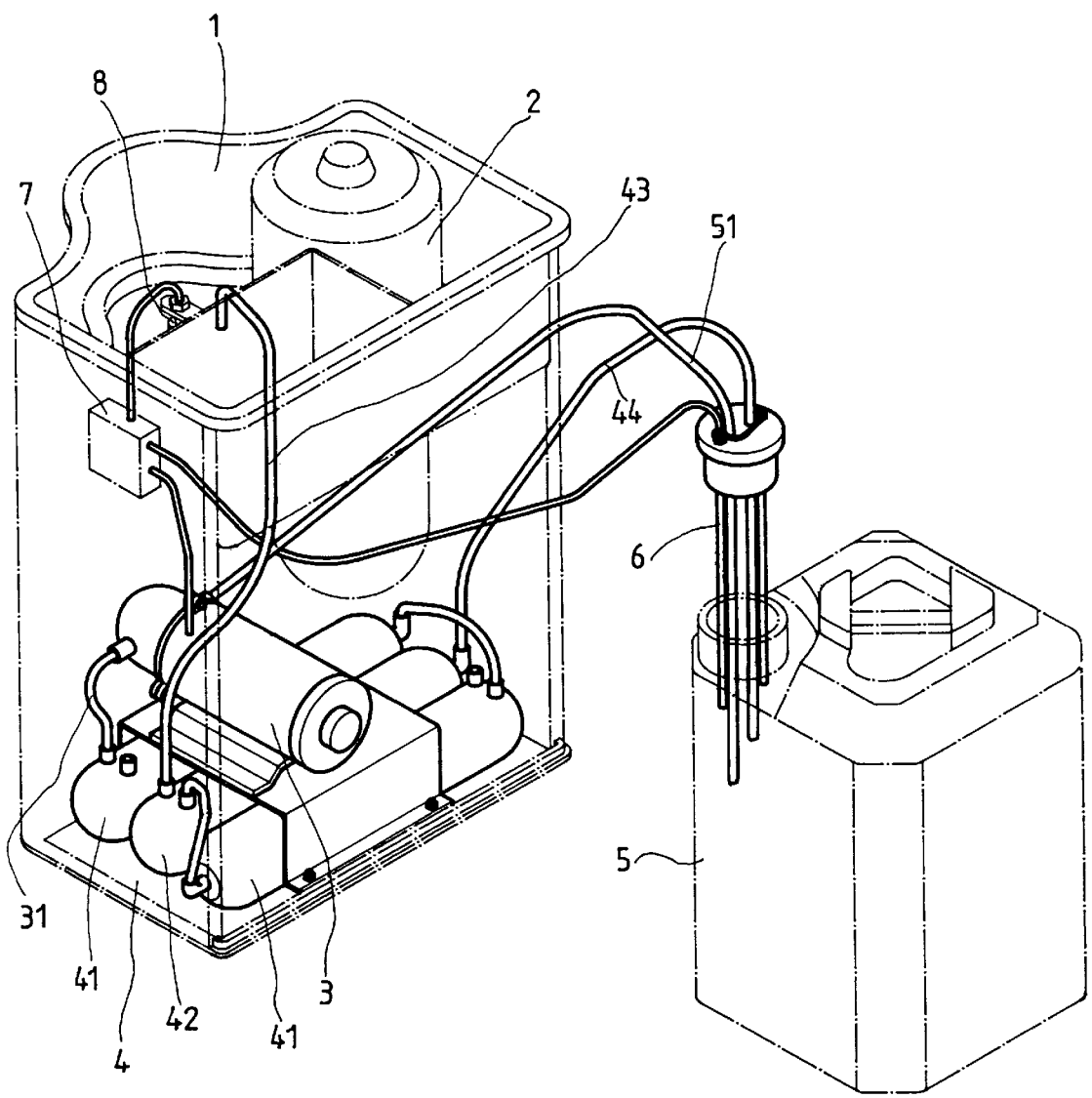
FIG. 1 is a structure schematic drawing of the present invention.

Referring to FIG. 1, the present invention provides a desktop drinking water machine including a storage tank 1 connected to a cartridge heater 2, a pump 3 and a reverse osmosis apparatus 4, cooperating with an original reservoir 5. The main features of this machine are as follows:

The reverse osmosis apparatus 4 includes at least two active carbon filters 41 and one reverse osmosis filter 42, in which the two active carbon filters 41 are connected together in series, and connect to the reverse osmosis filter 42 to form the first half of the filtering processing unit; wherein the first active carbon filter 41 is connected with pump 3 through an inlet pipe 31 and the pump 3 is connected to the original reservoir 5 by a pipe 51. A pure water pipe 43 extends from reverse osmosis filter 42 into the storage tank 1, and outlet pipe 44 extends from the reverse osmosis filter into the original reservoir 5, in which a water level sensor 6 connected to the processor 7 is mounted inside the reservoir 5. The processor 7 is linked to the pump 3, and a floating sensor 8 is mounted inside of the storage tank 1 and is also linked to the processor 7 to control the pump 3, so that both the water level sensor 6 and the floating sensor 8 can make the controllable pump 3 start or stop at the right moment.

Figure 2:
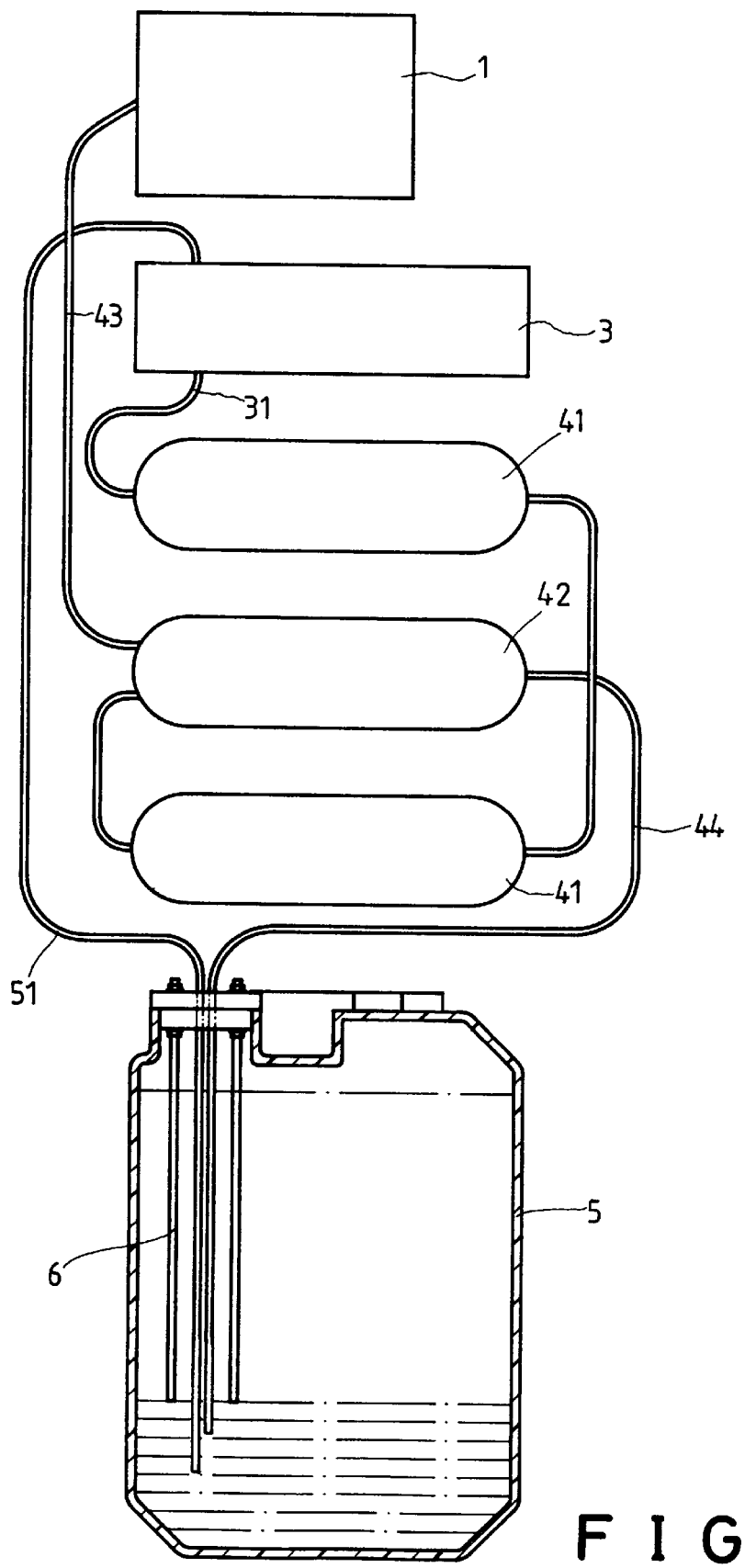
FIG. 2 is an operation flow-process diagram of the present invention.

Referring to FIG. 2, in operation, the original reservoir 5 is filled fully with the original water, and the two bars of the water level sensor 6 are located in the water at a predetermined position. A signal will be sent to processor 7 to trigger the controllable pump 3 to pump the water into the reverse osmosis apparatus 4 via the inlet pipe 31 to activate the purification process. In the reverse osmosis apparatus 4, the water passes through both of the active carbon filters 41, then flows into reverse osmosis filter 42 to be divided into pure water and waste water. The pure water is directed into the storage tank 1 through pure water pipe 43, and the waste water will flow back into the original reservoir 5 through the outlet pipe 44 to join the water left in the original reservoir 5 for repurification. The purification process will go through such recirculation until the water left in the original reservoir 5 drops below the water level sensor 6, which occurs when the volume of the remaining water is less than one-third of the original volume, causing pump 3 to stop. As the purified pure water fills up storage tank 1, pump 3 may also be stopped by the output of floating sensor 28.

In brief, a full tank of original water can be transformed into a volume of pure water equal to two-thirds the volume of the original, unpurified water, the remaining one-third being waste water. This is a higher ratio of purified to unpurified water than found in conventional reverse osmosis drinking water machines. The waste water may be used for other purposes, such as the watering of flowers and toilet flushing.

The desktop reverse osmosis drinking water machine of this invention can save money and water, and is extremely portable and convenient.

I claim:

1. A drinking water purification system comprising:

a reservoir for containing water to be purified having a reservoir outlet port and a reservoir return port;

reverse osmosis filtering means for filtering said water from said reservoir, said means for filtering having a reverse osmosis inlet port, a purified water outlet port and a waste water outlet port;

pump means for pumping water from said reservoir to said reverse osmosis filtering means, said pump means coupled between said reservoir outlet port and said reverse osmosis inlet port for extracting water from said reservoir and charging said reverse osmosis filtering means with said water;

a storage tank for containing purified water;

a pure water pipe fluidly connecting said reverse osmosis filtering means to said storage tank;

a waste water pipe fluidly connecting said reverse osmosis filtering means to said reservoir;

processing means for activating and deactivating said pump means;

a water level sensor fixedly mounted within said reservoir and in electrical communication with said processing means for activating said pump means when said water level sensor senses a predetermined volume of water in said reservoir;

a floating sensor placed within said storage tank and in electrical communication with said processing means for deactivating said pump means when said floating sensor senses a predetermined volume of water in said storage tank;

a cartridge heater located in said storage tank for heating purified water contained therein.

2. The drinking water purification system as recited in claim 1 where said reverse osmosis filtering means comprises at least two active carbon filters and a reverse osmosis filter.

3. The drinking water purification system as recited in claim 2 where said reverse osmosis filter comprises two outlets, the first outlet connected to said pure water pipe and the second outlet connected to said waste water pipe.

4. The drinking water purification system as recited in claim 2 where said active carbon filters are connected in series prior to connection to said reverse osmosis filter.

* * * * *